(12) United States Patent
Iwamura et al.

(10) Patent No.: US 9,847,523 B2
(45) Date of Patent: Dec. 19, 2017

(54) BATTERY PACK

(75) Inventors: Norihiro Iwamura, Mie (JP); Masaaki Sakaue, Mie (JP); Masaki Ikeda, Mie (JP); Naoki Shimizu, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 516 days.

(21) Appl. No.: 13/979,708

(22) PCT Filed: Nov. 11, 2011

(86) PCT No.: PCT/JP2011/076043
§ 371 (c)(1),
(2), (4) Date: Jul. 15, 2013

(87) PCT Pub. No.: WO2012/098756
PCT Pub. Date: Jul. 26, 2012

(65) Prior Publication Data
US 2013/0337298 A1 Dec. 19, 2013

(30) Foreign Application Priority Data

Jan. 20, 2011 (JP) ................................. 2011-010080

(51) Int. Cl.
*H01M 2/34* (2006.01)
*H01M 10/48* (2006.01)
(Continued)

(52) U.S. Cl.
CPC ....... *H01M 2/348* (2013.01); *H01M 10/4257* (2013.01); *H01M 10/486* (2013.01);
(Continued)

(58) Field of Classification Search
CPC .............................. H01M 2/1094; H01M 2/34
(Continued)

(56) References Cited

U.S. PATENT DOCUMENTS

| 5,847,538 A | 12/1998 | Yoshimatsu |
| 6,713,210 B1 * | 3/2004 | Sato et al. ....................... 429/62 |

(Continued)

FOREIGN PATENT DOCUMENTS

| JP | 2008-236877 A | 10/2008 |
| WO | WO 99/60637 A1 | 11/1999 |

OTHER PUBLICATIONS

International Search Report for corresponding International Application No. PCT/JP2011/076043 dated Jan. 31, 2012.
(Continued)

*Primary Examiner* — Jonathan Jelsma
*Assistant Examiner* — Rashid Alam
(74) *Attorney, Agent, or Firm* — Renner, Otto, Boisselle & Sklar, LLP

(57) ABSTRACT

The battery pack includes a battery cell for supplying electric power to an external device connected thereto, a temperature sensor for sensing a temperature of a place on which the temperature sensor is arranged, a switch member for making and breaking an electric path between the external device and the battery cell; and a controller configured to control the switch member to turn on and off according to the temperature sensed by the temperature sense. The temperature sensor is arranged on a position between the battery cell and the switch member so as to be affected by the temperatures of both of the battery cell and the switch member.

5 Claims, 2 Drawing Sheets

(51) Int. Cl.
*H01M 10/637* (2014.01)
*H01M 10/613* (2014.01)
*H01M 10/42* (2006.01)
*H01M 2/10* (2006.01)
*H01M 10/643* (2014.01)
*H02J 7/00* (2006.01)

(52) U.S. Cl.
CPC ....... *H01M 10/613* (2015.04); *H01M 10/637* (2015.04); *H01M 2/1055* (2013.01); *H01M 10/643* (2015.04); *H01M 2200/10* (2013.01); *H01M 2220/30* (2013.01); *H02J 7/0026* (2013.01)

(58) Field of Classification Search
USPC .......................................................... 429/61
See application file for complete search history.

(56) References Cited

U.S. PATENT DOCUMENTS

| | | | |
|---|---|---|---|
| 7,948,210 B2 | 5/2011 | Funabashi et al. | |
| 2003/0185278 A1* | 10/2003 | Roepke ............... | H01M 10/486 374/152 |
| 2003/0223474 A1* | 12/2003 | Roepke ............... | H01M 10/486 374/152 |
| 2008/0252263 A1 | 10/2008 | Funabashi et al. | |
| 2009/0243545 A1* | 10/2009 | Iwamura et al. ............. | 320/134 |
| 2010/0285340 A1* | 11/2010 | Matsunaga ..................... | 429/90 |

OTHER PUBLICATIONS

Form PCT/ISA/237 for corresponding International Application No. PCT/JP2011/076043 dated Jan. 31, 2012.
Extended European Search Report dated Nov. 15, 2016 for corresponding European Application No. 11856364.2.

* cited by examiner

BATTERY PACK

TECHNICAL FIELD

The invention relates to a battery pack for supplying electricity to an external device such as a power tool.

BACKGROUND ART

There has been proposed a battery pack 11 as shown in FIG. 3 configured to supply electric power to an external device (not shown) such as a power tool (see e.g. JP2008-236877A).

The conventional battery pack 11 includes battery cells 12, a switch member 13 for making and breaking an electric path between an external device to be connected and the battery cell 12, a temperature detection member 14 for measuring a temperature, and a control member 15 configured to control the switch member 13 to turn on and off according to the measured temperature. The temperature detection member 14 is arranged adjacent to one of the battery cells 12.

When the external device connected to the battery pack 11 performs a continuous work, a high-load work, or the like, the temperature of the battery cell 12 in the battery pack 11 increases due to the internal resistance.

With regard to this, the conventional battery pack 11 is configured to measure the temperature of the battery cell 12 by the temperature detection member 14, and is configured to break the electrical connection between the battery cell 12 and the external device by means of the switch member 13 before the temperature of the battery cell 12 excessively increases. The above-described battery pack 11 is thereby to be protected from causing a failure, smoking, burning and the like.

However, in the conventional battery pack 11, there is a problem that the switch member 13 may generate heat and the temperature of the switch member 13 may excessively increase due to the internal resistance, before the temperature of the battery cell 12 excessively increases. In this case, the battery pack 11 may be caused a failure, smoking, burning or the like.

DISCLOSURE OF THE INVENTION

The present invention is developed in view of above problem, and it is an object of the present invention to provide a battery pack capable of preventing not only an excess increase of the temperature of the battery cell but also an excess increase of the temperature of the switch member, thereby providing a battery pack having an improved safety.

A battery pack of the invention includes: a battery cell for supplying electric power to an external device connected thereto; a temperature sensor for sensing a temperature of a place on which the temperature sensor is arranged; a switch member for making and breaking an electric path between the external device and the battery cell; and a controller configured to control the switch member to turn on and off according to the temperature sensed by the temperature sensor. The temperature sensor is arranged on a position between the battery cell and the switch member so that the temperature sensor is affected by the temperatures of both of the battery cell and the switch member.

It is preferred that the battery pack of the invention further includes a substrate for mounting thereon the switch member, the substrate being arranged near the battery cell. The temperature sensor is arranged closer to the battery cell than the substrate is.

In the battery pack of the invention, it is preferred that the temperature sensor is mounted on a facing surface of the substrate, the facing surface facing the battery cell.

In the battery pack of the invention, it is preferred that the switch member is mounted on an opposite surface of the substrate, the opposite surface facing a side opposite of the battery cell.

It is preferred that the battery pack of the invention further includes a substrate constituted by a double-sided board. The switch member is arranged on a first surface of the substrate, and the temperature sensor is mounted on a second surface of the substrate. The substrate is arranged so that the second surface thereof faces the battery cell.

In the battery pack of the invention, it is preferred that the switch member is arranged on the first surface of the substrate so that at least one portion of the switch member faces at least one portion of the temperature sensor with interleaving the substrate therebetween.

In the battery pack of the invention, it is preferred that the substrate is made of a low-thermal conductive material. The switch member is arranged on the first surface of the substrate so that at least one portion of the switch member faces at least one portion of the temperature sensor with interleaving the substrate therebetween. The substrate is provided with a thermal coupling section made of a material having higher thermal conductivity than a material of the substrate, the thermal coupling section is formed in the substrate at a place sandwiched between the temperature sensor and the switch member, the thermal coupling section thermally coupling the temperature sensor with the switch member.

In this case, the thermal coupling section may be constituted by a thermally conductive material that is filled in a through hole passing through the substrate.

In the battery pack of the invention, it is preferred that the temperature sensor is in direct contact with the battery cell.

The battery pack of the invention allows to prevent an excess increase of the switch member as well as an excess increase of the temperature of the battery cell, thereby having an improved safety.

DESCRIPTION OF THE INVENTION

The invention is described below based on an embodiment illustrated in attached figures.

Figure 2:
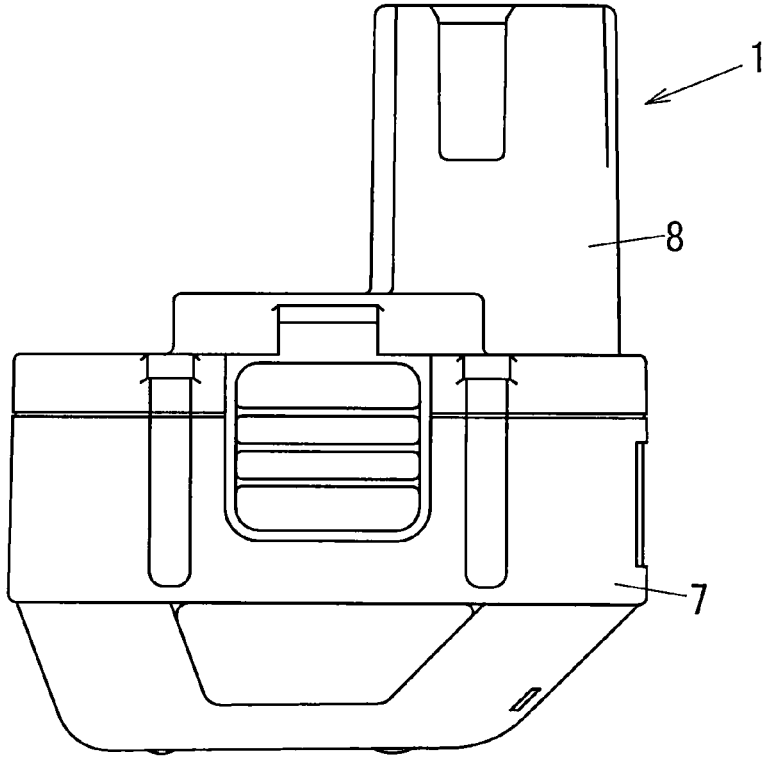
FIG. 2 is a side view of the battery pack according to the embodiment.
Figure 3:
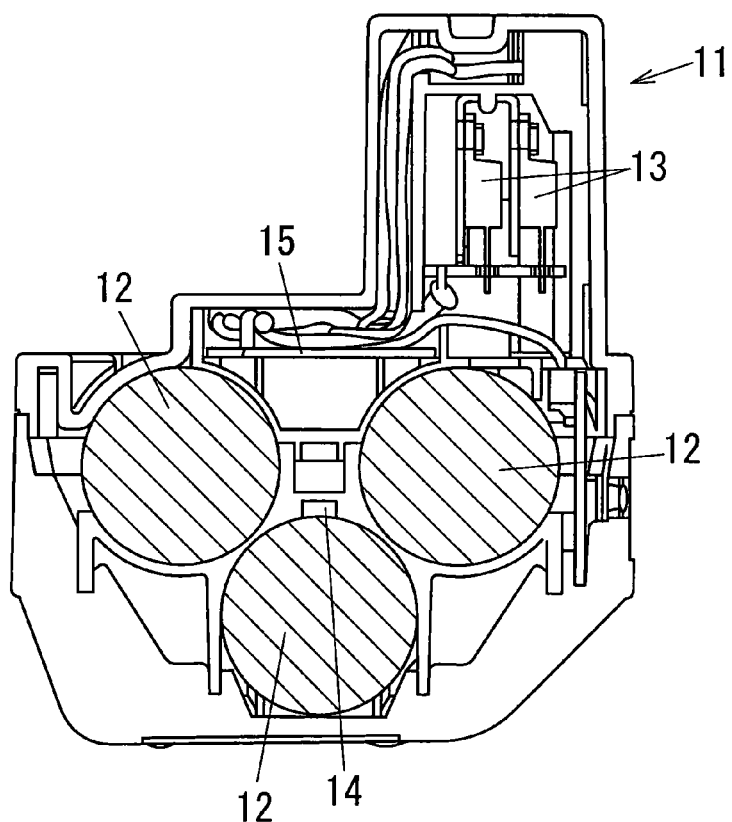
FIG. 3 is a sectional side view of a conventional battery pack.

A battery pack 1 of the embodiment (shown in FIG. 2) is preferably configured to be connected to an external device equipped with a high-powered motor, such as an electric tool. The battery pack 1 is configured to be detachably connected to an external device. The battery pack 1 is configured to supply electric power to the connected external device.

Figure 1:
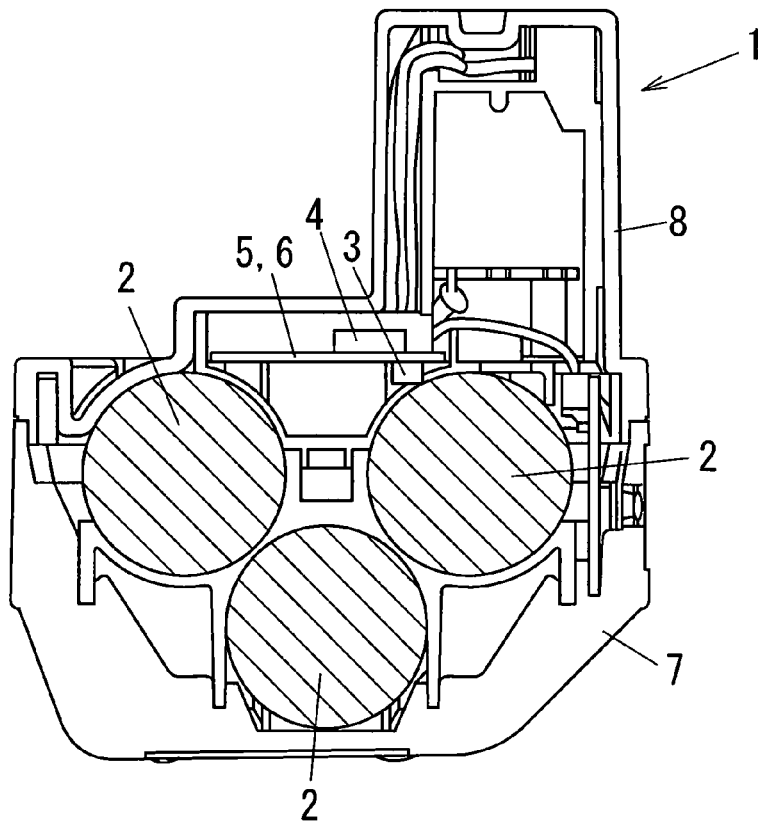
FIG. 1 is a sectional side view of a battery pack according to an embodiment of the invention.

FIG. 1 is a sectional view showing the structure of the battery pack 1 according to the embodiment.

The battery pack 1 includes therein a plurality ("3" in the structure shown in the figure) of battery cells 2, a temperature sensor 3, a switch member 4, and a substrate 6 provided with a controller 5. The controller 5 is configured to control an on/off state of the switch member 4. The battery pack 1 has a pack main body 7 at a lower portion thereof, and above-described components are arranged on the inside of the pack main body 7. The battery pack 1 has a connection section 8 at an upper portion thereof, and the connection section 8 is configured to be detachably connected to an external device. When the connection section 8 is connected to an external device, electric power can be supplied from the battery cells 2 to the external device.

The battery cells 2 are connected in series each other. The battery cells 2 can supply high-power to the connected external device. For example, each of the battery cells 2 is in the form of a rechargeable secondary cell such as a lithium-ion cell, and has a columnar shape. In the embodiment, three of the battery cells 2 are arranged in the pack main body 7 so that two of them are arranged side-by-side in the upper region of the pack main body 7 and rest of them is arranged in the lower region of the pack main body 7, thereby being arranged in a triangle shape. The number of the battery cells 2 is determined in accordance with the required electric power for the external device to be connected, and may be one or plural (two or more than three). The battery cells 2 may be connected in parallel. The battery cells 2 may be arranged in a shape other than the triangle arrangement.

The substrate 6 is arranged on the upper side of the battery cells (2, 2) arranged side-by-side. The substrate 6 is arranged near the battery cells (2, 2). In the embodiment, the substrate 6 is constituted by a double-sided board. The switch member 4 is mounted on the upper surface (first surface) of the substrate 6 (i.e. on a surface of the substrate 6 facing a side opposite to the battery cell 2), and the temperature sensor 3 is mounted on the lower surface (second surface) of the substrate 6 (i.e. on a battery cell 2 side surface of the substrate 6). In other words, the temperature sensor 3 and the switch member 4 are respectively arranged on front and reverse surfaces of the substrate 6.

The temperature sensor 3 is in the form of a surface-mounted element, and may be constituted by a chip thermistor. The temperature sensor 3 is arranged on the lower surface (second surface) of the substrate 6 so as to be adjacent to one of the battery cells (2, 2) arranged side-by-side.

The switch member 4 is configured to make and break an electric path between the battery cell 2 and the connected external device. The switch member 4 is constituted by a miniature relay, a FET (Field Effect Transistor), or the like. The switch member 4 is connected in series with the battery cell 2. The switch member 4 is arranged on the upper surface (first surface) of the substrate 6 so as to be near the temperature sensor 3.

Note that specific arrangement of the temperature sensor 3, the switch member 4 and the substrate 6 is determined appropriately in view of an intention that the excess increases of the temperatures of both the battery cell 2 and the switch member 4 can be detected through the temperature measured by the temperature sensor 3.

The temperature sensor 3 may be thermally coupled with the adjacent battery cell 2 by means of such as thermally conductive resin. The temperature sensor 3 may be in direct contact with at least one portion of the battery cells 2, as shown in FIG. 1. This configuration allows to reliably measure the temperature of the battery cell 2.

The switch member 4 may be arranged on the first surface of the substrate 6 (i.e. on the surface of the substrate 6 opposite to the surface on which the temperature sensor 3 is mounted) so that at least one portion of the switch member 4 faces at least one portion of the temperature sensor 3 with interleaving the substrate 6 therebetween, as shown in FIG. 1. With this configuration, the heat generated in the switch member 4 is transmitted to the temperature sensor 3 directly, except for the substrate 6. This configuration therefore allows to reliably measure the temperature of the switch member 4.

Figure 4:
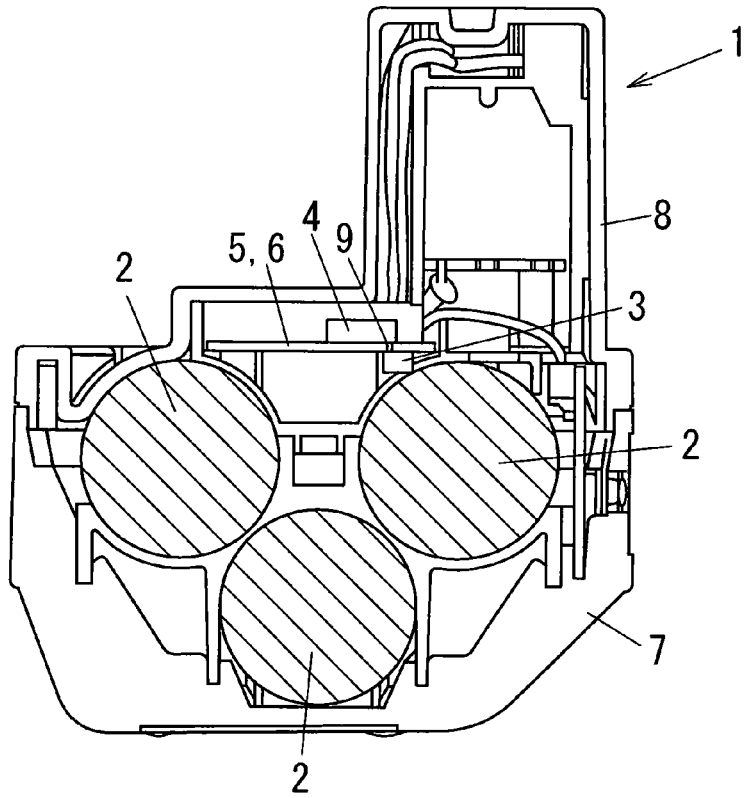
FIG. 4 is a sectional side view of another battery pack according to the embodiment of the invention.

Furthermore, such a configuration is preferable that the substrate 6 is made of a low-thermal conductive material, the switch member 4 is arranged so that at least one portion of the switch member 4 faces at least one portion of the temperature sensor 3 with interleaving the substrate 6 therebetween, and the substrate 6 is provided with a thermal coupling section 9 for thermally coupling the temperature sensor 3 with the switch member 4 (see FIG. 4). The thermal coupling section 9 is made of a material having higher thermal conductivity than a material of the substrate 6. The thermal coupling section 9 is formed in the substrate 6 at a place sandwiched between the temperature sensor 3 and the switch member 4. The thermal coupling section 9 may be constituted by a thermally conductive material (e.g. thermally conductive resin) that is filled in a through hole perforating the substrate 6.

The controller 5 is provided on the substrate 6. The controller 5 is configured to control the switch member 4 to turn on and off according to the temperature sensed by the temperature sensor 3. Under normal condition (in which the temperature sensed by the temperature sensor 3 is lower than a predetermined value), the controller 5 controls the switch member 4 to turn on (close), thereby electrically connecting the battery cell 2 with the external device. The controller 5 controls the switch member 4 to turn off (open) when the temperature sensed by the temperature sensor 3 increases to the predetermined value, thereby breaking the electrical connection between the battery cell 2 and the external device.

The battery pack 1 of the embodiment having above-described structure behaves as follows when the temperature of the battery cell 2 and/or the switch member 4 in the battery pack 1 increases due to the internal resistance thereof (e.g. when the external device connected to the battery pack 1 performs a continuous work, a high-load work or the like).

When the temperature measured by the temperature sensor 3 increases to the predetermined value, the controller 5 turns off the switch member 4 to break the electrical connection between the battery cell 2 and the external device. When the switch member 4 is turned off, the battery cell 2 and the switch member 4 do not have a load any more. Therefore, the increases of the temperatures of the battery cell 2 and the switch member 4 can be prevented. Note that, the battery pack 1 is preferably configured so as to be prohibited the reconnection between the battery cell 2 and the external device for a predetermined time, when the electrical connection is broken by the controller 5.

When the electrical connection between the battery cell 2 and the external device is kept broken for a while, the temperatures of the battery cell 2, the switch member 4, and the intermediate area therebetween gradually decrease. The temperature sensed by the temperature sensor 3 comes to be lower than the predetermined value, and then the controller 5 controls the switch member 4 to turn on so as to electrically reconnect the battery cell 2 with the external device.

The controller 5 may be configured so as to turn off the switch member 4 when the temperature measured by the temperature sensor 3 increases to a first temperature T1, and to turn on the switch member 4 when the temperature measured by the temperature sensor 3 decreases to a second temperature T2, where the second temperature T2 is smaller than the first temperature T1 (T2<T1).

Accordingly, the battery pack 1 of the embodiment can prevent not only the excess increase of the temperature of the battery cell 2 but the excess increase of the temperature of the switch member 4.

In conclusion, the battery pack 1 of the embodiment includes therein the battery cell 2 for supplying electric power to an external device connected thereto; and the temperature sensor 3 for sensing a temperature of a place on which the temperature sensor 3 is arranged. The battery pack 1 further includes therein the switch member 4 for making and breaking an electric path between the external device and the battery cell 2; and the controller 5 configured to control the switch member 4 to turn on and off according to the temperature sensed by the temperature sensor 3. The battery pack 1 of the embodiment is characterized in that the temperature sensor 3 is arranged on a position between the battery cell 2 and the switch member 4 so as to be affected by both of the temperature of the battery cell 2 and the temperature of the switch member 4.

According to this configuration, the battery pack 1 of the embodiment measures the temperature of the position which is affected by both of the temperature of the battery cell 2 and the temperature of the switch member 4. As a result, the battery pack 1 of the embodiment can break the electrical connection between the battery cell 2 and the external device before at least one of the temperature of the battery cell 2 and the temperature of the switch member 4 increases excessively.

Accordingly, the battery pack 1 of the embodiment can prevent not only the excess increase of the temperature of the battery cell 2 but also the excess increase of the temperature of the switch member 4, and therefore has an improved safety.

In addition, the battery pack 1 of the embodiment is not required to include individual temperature sensors that are adapted respectively for the battery cell 2 and the switch member 4. Therefore, the present embodiment can reduce the number of the components, reduce the cost, and be downsized.

The battery pack 1 of the embodiment further includes the substrate 6 for mounting thereon the switch member 4 so that the substrate 6 is arranged near the battery cell 2. The temperature sensor 3 is arranged nearer the battery cell 2 in relation to the substrate 6.

According to this configuration for limiting the structure of the battery pack 1, the battery cell 2, the substrate 6, the switch member 4 and the temperature sensor 3 are arranged near each other. The battery pack 1 of the embodiment therefore can be downsized.

In the battery pack 1 of the embodiment, the temperature sensor 3 is mounted on the facing surface of the substrate 6, where the facing surface faces the battery cell 2.

According to this configuration for further limiting the structure of the battery pack 1, both of the switch member 4 and the temperature sensor 3 are mounted on the substrate 6. As a result, the battery pack 1 can be further downsized. In addition, because the heat generated in the switch member 4 is transmitted to the temperature sensor 3 through the substrate 6, the battery pack 1 can detect the increase of the temperature of the switch member 4 reliably.

In the battery pack 1 of the embodiment, the switch member 4 is mounted on the opposite surface of the substrate 6, where the opposite surface faces the opposite side of the battery cell 2.

According to this configuration for further limiting the structure of the battery pack 1, the substrate 6 is located between the switch member 4 and the battery cell 2. Therefore, this configuration can prevent the increases of the temperatures of the switch member 4 and the battery cell 2 from influencing each other. That is, the substrate 6 can block a direct thermal radiation from the switch member 4 to the battery cell 2 as well as block a direct thermal radiation from the battery cell 2 to the switch member 4.

Described in other words, the battery pack 1 of the embodiment includes the substrate 6 constituted by a double-sided board. The switch member 4 is arranged on the first surface of the substrate 6. The temperature sensor 3 is mounted on the second surface of the substrate 6. The substrate 6 is arranged so that the second surface thereof faces the battery cell 2.

According to this configuration, the battery pack 1 of the embodiment can be downsized. In addition, the substrate 6 can block a direct thermal radiation from the switch member 4 to the battery cell 2 as well as block a direct thermal radiation form the battery cell 2 to the switch member 4. As a result, this configuration can prevent the increases of the temperatures of the switch member 4 and the battery cell 2 from influencing each other.

It is preferred that the switch member 4 is arranged on the surface of the substrate 6 that is opposite to the surface on which the temperature sensor 3 is mounted so that at least one portion of the switch member 4 faces at least one portion of the temperature sensor 3 with interleaving the substrate 6 therebetween.

According to this configuration, the heat generated in the switch member 4 is transmitted to the temperature sensor 3 through merely the substrate 6. This configuration therefore allows to reliably measure the temperature of the switch member 4.

It is also preferred that the substrate 6 is made of a low-thermal conductive material. The switch member 4 is arranged on the surface of the substrate 6 that is opposite to the surface on which the temperature sensor 3 is mounted so that at least one portion of the switch member 4 faces at least one portion of the temperature sensor 3 with interleaving the substrate 6 therebetween. The substrate 6 is provided with a thermal coupling section 9 made of a material having higher thermal conductivity than a material of the substrate 6 at a place sandwiched between the temperature sensor 3 and the switch member 4 so that the thermal coupling section 9 thermally couples the temperature sensor 3 with the switch member 4. The thermal coupling section 9 can be formed by a thermally conductive material filled in a through hole passing through the substrate 6.

According to this configuration, the substrate 6 can block the thermal radiations from the switch member 4 and the battery cell 2, while the heat generated in the switch member 4 can be transmitted to the temperature sensor 3 through the thermal coupling section 9.

The temperature sensor 3 can be arranged in direct contact with the battery cell 2. According to this configuration, the temperature of the battery cell 2 can be reliably measured.

Although the present invention has been described with reference to certain preferred embodiments, numerous modifications and variations can be made by those skilled in the art without departing from the true spirit and scope of this invention, namely claims.

The invention claimed is:

1. A battery pack comprising:
 a battery cell for supplying electric power to an external device connected thereto;
 a temperature sensor for sensing a temperature of a place on which the temperature sensor is arranged;
 a switch member for making and breaking an electric path between the external device and the battery cell;
 a controller configured to control the switch member to turn on and off according to the temperature sensed by the temperature sensor; and
 a substrate on which the temperature sensor and the switch member are mounted,
 wherein the substrate is arranged between the switch member and the battery cell,
 wherein the temperature sensor is mounted on a face, facing the battery cell, of the substrate on a position near the battery cell so as to be affected by temperatures of both of the battery cell and the switch member,
 wherein the switch member is mounted on a face, facing an opposite side to the battery cell, of the substrate,
 wherein the switch member is arranged on the face, facing an opposite side to the battery cell, of the substrate so that at least one portion of the switch member overlaps with at least one portion of the temperature sensor in a thickness direction of the substrate with the substrate interposed therebetween, and
 wherein the substrate is provided with a thermal coupling section made of material having higher thermal conductivity than that of material of the substrate, the thermal coupling section being formed in the substrate at a place sandwiched between the temperature sensor and the switch member, the thermal coupling section thermally coupling the temperature sensor with the switch member.

2. A battery pack comprising:
 a battery cell for supplying electric power to an external device connected thereto;
 a temperature sensor for sensing a temperature of a place on which the temperature sensor is arranged;
 a switch member for making and breaking an electric path between the external device and the battery cell;
 a controller configured to control the switch member to turn on and off according to the temperature sensed by the temperature sensor; and a substrate constituted by a double-sided board,
 wherein the temperature sensor is arranged on a position between the battery cell and the switch member so as to be affected by temperatures of both of the battery cell and the switch member,
 wherein the switch member is arranged on a first surface of the substrate, and the temperature sensor is mounted on a second surface of the substrate,
 wherein the substrate is arranged so that the second surface thereof faces the battery cell,
 wherein the switch member is arranged on the first surface of the substrate so that at least one portion of the switch member overlaps with at least one portion of the temperature sensor in a thickness direction of the substrate with the substrate interposed therebetween, and
 wherein the substrate is provided with a thermal coupling section made of material having higher thermal conductivity than that of material of the substrate, the thermal coupling section being formed in the substrate at a place sandwiched between the temperature sensor and the switch member, the thermal coupling section thermally coupling the temperature sensor with the switch member.

3. The battery pack as set forth in claim 2,
 wherein the substrate is made of a low-thermal conductive material, and
 wherein the switch member is arranged on the first surface of the substrate so that at least one portion of the switch member faces at least one portion of the temperature sensor with interleaving the substrate therebetween.

4. The battery pack as set forth in claim 3, wherein the thermal coupling section is constituted by a thermally conductive material filled in a through hole that passes through the substrate.

5. The battery pack as set forth in claim 2, wherein the temperature sensor is in direct contact with the battery cell.

* * * * *